(12) United States Patent
Krenn

(10) Patent No.: US 7,805,968 B2
(45) Date of Patent: Oct. 5, 2010

(54) SYSTEM FOR SETTING UP AND CONTROLLING A CONFERENCE CIRCUIT

(75) Inventor: Andreas Krenn, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 2645 days.

(21) Appl. No.: 10/170,190

(22) Filed: Jun. 13, 2002

(65) Prior Publication Data

US 2002/0191766 A1    Dec. 19, 2002

(30) Foreign Application Priority Data

Jun. 13, 2001    (DE)    ............................. 101 28 727

(51) Int. Cl.
  *H04L 12/16*    (2006.01)
(52) U.S. Cl. .................. 70/263; 370/238; 370/352; 370/401
(58) Field of Classification Search ............. 370/259, 370/261, 262, 263, 238.1, 352, 401; 709/203–205; 379/203.01, 204.01, 205.01, 206.01, 265.09, 379/205
See application file for complete search history.

(56) References Cited

U.S. PATENT DOCUMENTS

| 5,408,526 | A | | 4/1995 | McFarland et al. |
|---|---|---|---|---|
| 5,452,348 | A | | 9/1995 | Adams et al. |
| 5,963,632 | A | | 10/1999 | Miloslavsky |
| 5,995,608 | A | * | 11/1999 | Detampel et al. ........... 370/261 |
| 6,049,602 | A | | 4/2000 | Foladare et al. |
| 6,584,076 | B1 | * | 6/2003 | Aravamudan et al. ....... 370/260 |
| 6,611,590 | B1 | * | 8/2003 | Lu et al. ................ 379/265.09 |
| 6,940,826 | B1 | * | 9/2005 | Simard et al. ............... 370/260 |
| 6,976,055 | B1 | * | 12/2005 | Shaffer et al. ............... 709/204 |

FOREIGN PATENT DOCUMENTS

| EP | 0 713 319 | 5/1996 |
|---|---|---|
| EP | 0 999 686 A2 | 5/2000 |
| EP | 1 073 249 A2 | 1/2001 |
| WO | WO 98/54877 | 12/1998 |

OTHER PUBLICATIONS

European Search Report for Application No. 02100666.3-2414; mailed Dec. 18, 2003.
German Examination Report for Application No. 101 28 727.5-42; dated Mar. 24, 2006.

* cited by examiner

*Primary Examiner*—Ian N Moore
(74) *Attorney, Agent, or Firm*—Staas & Halsey LLP

(57) ABSTRACT

An instruction for establishing a network-wide conference circuit in a telecommunication or IP network is transmitted to a switching computer or server in the network. At least one item of routing information with respect to the subscribers or other parties to the conference circuit is stored. An optimized pattern of connections of the conference circuit is calculated in the switching computer or server on the basis of the routing information.

24 Claims, 2 Drawing Sheets

SYSTEM FOR SETTING UP AND CONTROLLING A CONFERENCE CIRCUIT

CROSS REFERENCE TO RELATED APPLICATIONS

This application is based on and hereby claims priority to German Application No. 10128727.5 filed on Jun. 13, 2001, the contents of which are hereby incorporated by reference.

BACKGROUND OF THE INVENTION

The invention relates to a method for setting up and controlling a network-wide conference circuit in a telecommunication network and to a system suitable for carrying out this method.

Setting up a conference circuit is still a relatively complex and expensive process even in modern telecommunication networks—especially when the subscribers are connected to different switching centers of a network or even to different networks. A conference circuit can be booked by a subscriber by calling a call center where an agent then sets up the required pattern of connections. The agent can then attempt to minimize the costs depending on the requirements of the booking subscriber (urgency, availability of the subscribers throughout the day, needed quality of service (QoS)). However, this is possible only to a limited extent with an operator-controlled connection setup. Thus, an agent envisaging high connection costs from the list of parties to the conference circuit when setting up the conference circuit from its own switching center, can forward the booking on his own initiative to a call center which can probably set up the conference circuit at low total line costs because it is allocated to a more advantageous switching center. On the other hand, this procedure requires more personnel since two agents in different call centers are involved. This, in turn, increases the total expenditure.

Comparable problems occur when the setting up of a conference circuit is initiated from a data terminal via an internet protocol (IP) network, especially the Internet. Here, too, it is scarcely possible to define an optimum starting point for setting up the conference circuit in advance.

SUMMARY OF THE INVENTION

An object of the invention is to set up a conference circuit between subscribers using different switching centers which is optimized with regard to the line capacity needed or arising costs.

The invention includes the basic concept of automatically determining the most suitable starting point for establishing a conference circuit on the basis of stored routing information with regard to the relevant subscribers. It also includes the concept of processing this routing information, which is provided centrally or decentralized in a database, in a server connected to the telecommunication network or a switching computer of a switching center for determining an optimized pattern of connections. The establishment of this pattern of connections, i.e. the setting up of the desired conference circuit is then transmitted automatically by the server or switching computer to the most suitable switching center from the point of view of capacity or costs. This can still be the switching center the switching computer of which has performed the calculations but a connection set-up request to another switching center can also be generated and transmitted.

For more complex conference patterns which, for example, in each case include a number of subscribers at different switching centers which, in particular, are far apart from one another, a distribution of the connection set-up requests to different switching centers for implementing the correspondingly complex pattern of connections is appropriate.

As an alternative to the mentioned automatic instructing of a switching center by a server or switching computer calculating the pattern of connections, the result of the calculation can be sent to the subscriber needing the conference circuit or to an instructed agent of a call center who then initiates the connection set-up via the most suitable switching center on its own initiative. In this connection, the data of the calculated optimum pattern of connections can also be transferred to the subscriber or agent and he initiates the circuit set-up according to this data or according to the calculated pattern of connections. As an alternative, the data can also be transmitted to the selected switching center and are there available for implementation of the circuit set-up instructed "manually" by the subscriber or agent. To this extent, the invention also comprises variants in which a desired booking is implemented with the co-operation of a number of agents of call centers or other "subcontractors" when the relevant information with regard to the pattern of connections does not need to go to the booking subscriber or primarily instructed agent but can also go one or more of the other parties involved.

The calculation of an optimized pattern of connections—and thus of the selected switching computer as starting point—can be carried out only on the basis of routing information and considering the line capacities of the network or of the networks, implementing a conference circuit optimized with regard to capacity aspects. This provides the user with advantages, in particular, with regard to stability and freedom from interference of the connections and possibly with regard to the available channel capacity, for example for transmitting images during the conference.

In another suitable embodiment, tariff information which is also stored centrally in the network or decentralized in a server or switching computer is additionally used for calculating the pattern of connections. This makes it possible to implement a cost-optimized conference circuit.

In both variants, an embodiment is also advantageous in which not only an (optimized) pattern of connections is calculated but the server or switching computer also provides alternatives. This provides for a short-term switch to an alternative pattern of connections if high line utilization is currently registered, or other technical problems occur in the pattern optimized with regard to capacity and/or cost aspects. Here, too, automated or operator-guided switching is possible in each case.

The information needed for setting up and controlling the pattern of connections is transmitted to the switching centers involved either via data channels of an IP network or data and signaling channels of a digital telecommunication network, e.g. an ISDN-oriented network. These data channels can also be used for controlling a cascaded circuit set-up, established by involving a number of switching centers, by a control computer of a switching center or a server in the IP network. The conference circuit can thus be booked both by telephone (where the terminal of the subscriber or agent is a telecommunication terminal, particularly a land line or mobile telephone) or directly via the Internet or a further data network connected to it from a PC or PDA or the like by an Internet browser.

In a first appropriate embodiment, the conference circuit can comprise exclusively telecommunication terminals which are connected directly to a public telephone network or to a private branch exchange. In a further advantageous embodiment, it comprises, in addition to telecommunication terminals, also data terminals of subscribers to an IP network which, in particular, can be connected to the telecommunication network by media gateways. In the case of intercontinental connections, in particular, the interposition of VoIP (Voice-over-IP) links into voice transmission links can be worthwhile. In this sense, a data network would then be linked into a telephone network or between a number of telephone networks and the conference circuit is controlled by including at least one server in the data network.

The databases required for calculating the optimized pattern of connections, particularly the routing database but possibly also the tariff information database, are suitably available centrally in the IP network and can be accessed by the server or switching computer performing the calculation. In principle, however, decentralized data storage in the servers or switching computers themselves is also possible.

The (or each) server provided in the system according to the invention has an interface for data and control linkage to the switching centers of the telecommunication network and the information relevant to the connection set-up and the controlling of the conference circuit is transmitted either via data channels of the IP network or data or signaling channels of the telecommunication network. In the variant where the conference circuit is implemented via agents of a call center, naturally, networking to their data terminals is logical but the invention can also be carried out on the basis of a direct request from a subscriber for setting up a conference circuit.

For storing one or more calculated patterns of connections, suitable memories are provided both in the server or switching computer carrying out the calculation and in a main computer of the switching center(s) setting up the connection. Differentiation between the memory contents at the individual facilities is possible and in some cases also required—particularly in the case of a cascaded set-up of a conference circuit implemented by a number of switching centers.

In general, it must be pointed out here that the term "switching center" used herein is to be understood as generalized and includes local, regional and national switching centers and the so-called switches and gateways which connect different networks to one another—for example land line networks and mobile radio networks. In an important embodiment of the invention with regard to perspective, its concept is applied to the setting up and controlling of video and multimedia conferences which does not necessarily take place via a switching system in the narrower sense.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
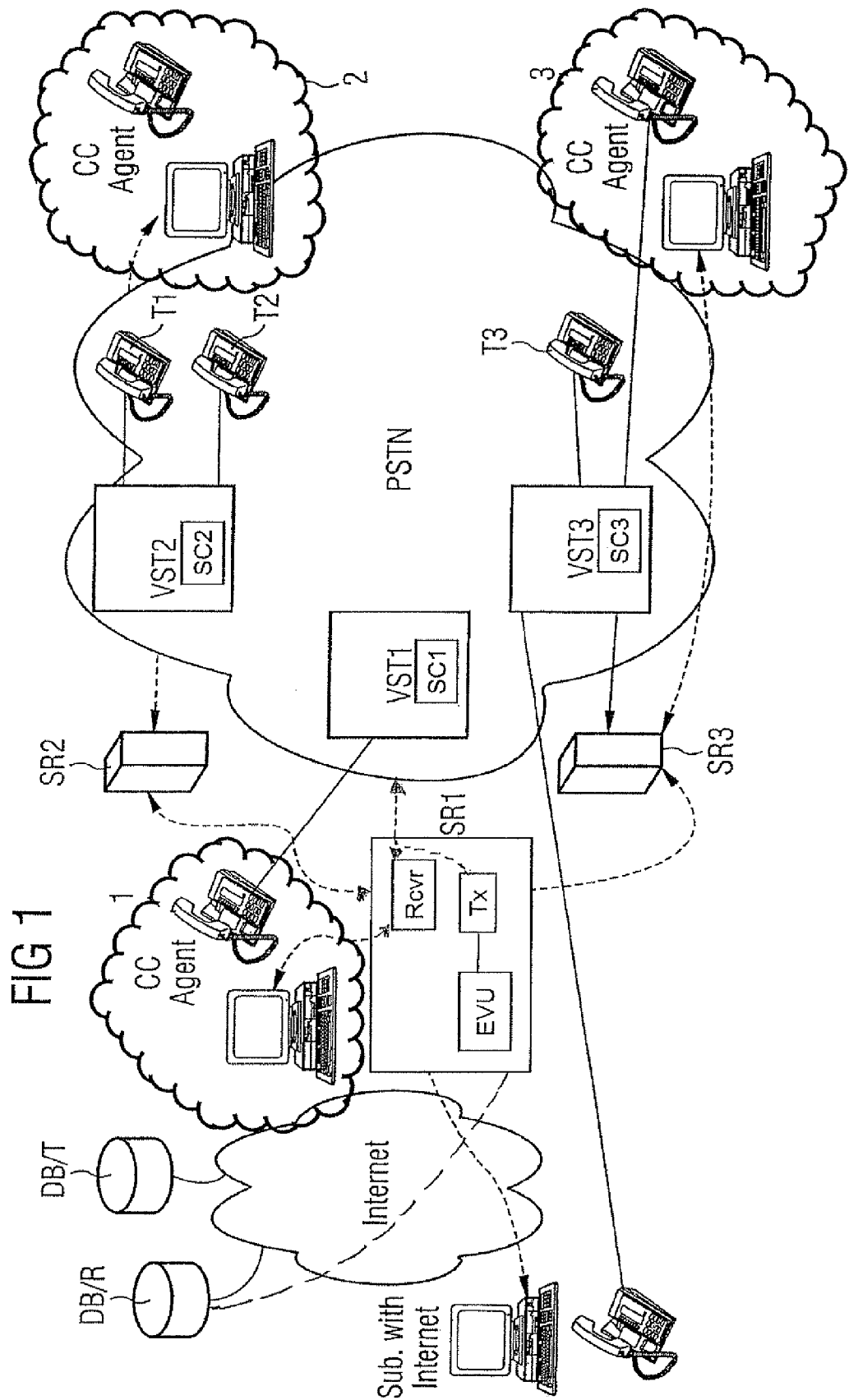
FIG. 1 is a block diagram of a system according to an embodiment of the invention.

Reference will now be made in detail to the preferred embodiments of the present invention, examples of which are illustrated in the accompanying drawings, wherein like reference numerals refer to like elements throughout.

FIG. 1 is a block diagram of a system for setting up a conference circuit between a number of terminals T1, T2, T3 of a telephone network PSTN, which are connected to two different switching centers, which may be private branch exchanges, VST2 and VST3 of the telephone network PSTN, with connection set-up and control by a data network server SR1 connected to a third switching center VST1. The data network server SR1 is connected to two other servers SR2 and SR3 to which the agent terminals CC Agent 2 and CC Agent 3 are connected and an agent terminal CC Agent 1 is directly connected to the data network server.

The data network server SR1 is connected to the Internet and has access via this to (among other things) a database DB/R for routing information and a database DB/T for tariff information with regard to the public telephone network PSTN. The data network server SR1 comprises a calculating unit EVU in which optimum patterns of connections for establishing a conference circuit between the subscribers of the terminals T1, T2 and T3 are calculated by accessing these databases DB/R and DB/T and including the agents 1, 2, 3 of the call center.

Based on the result of the calculation, the data network server SR1 sends a connection set-up request to the switching computers or servers allocated to the switching centers VST1 or VST2 and sets up the desired conference circuit under its own initiative, depending on the actual line capacity and tariff situation. The booking of the conference circuit can have been transmitted by one of the call center agents 1, 2, 3 via one of the terminals CC Agent 1, CC Agent 2 or CC Agent 3.

Figure 2A:
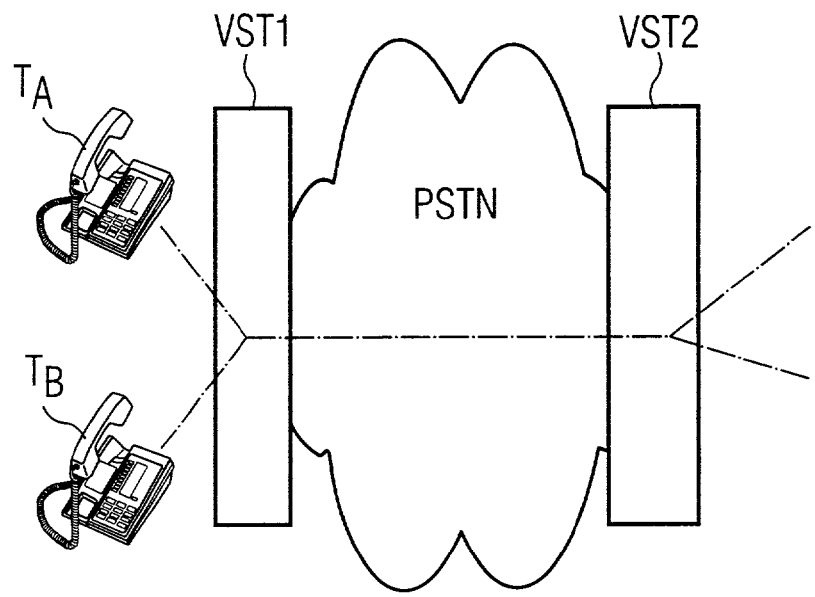
FIGS. 2A, 2B and 2C are block diagrams of different patterns of connections.
Figure 2B:
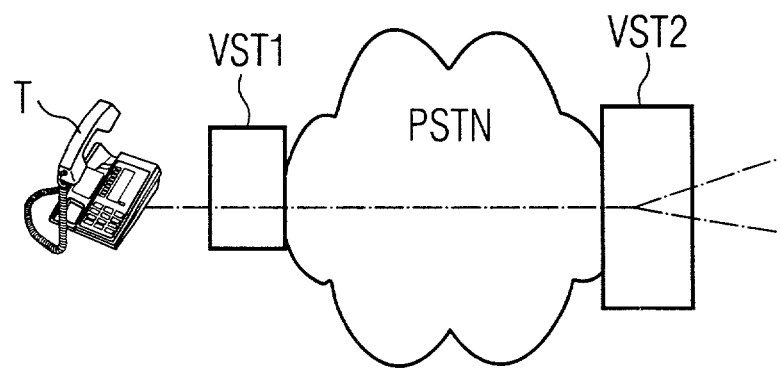
Figure 2C:
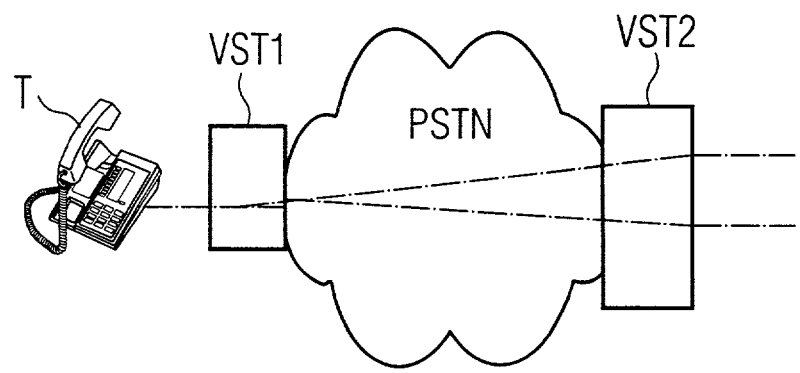

FIGS. 2A to 2C show various patterns of connections for setting up conference circuits in the telephone network PSTN in a simplifying manner by assuming the involvement of only two switching centers VST1 and VST2. FIG. 2A shows a double dedicated configuration for interconnecting two terminals $T_A$ and $T_B$, connected to the switching center VST1, in conference circuits with two further terminals (not shown) at the switching center VST2. FIG. 2B shows a single star circuit which is implemented in the switching center VST2 and FIG. 2C shows such a one branched off, however, in the switching center VST1.

The invention has been described in detail with particular reference to preferred embodiments thereof and examples, but it will be understood that variations and modifications can be effected within the spirit and scope of the invention.

What is claimed is:

1. A method for setting up and controlling a conference circuit between subscriber terminals connected to different network nodes of at least one of a telecommunication network and an internet protocol network, comprising:
   transmitting an instruction for establishing the conference circuit from one of a subscriber terminal and an agent terminal of a call center to one of a switching computer and a server in the network storing at least one routing information item with respect to parties who will use the conference circuit;
   calculating an optimized pattern of connections of the conference circuit in the one of a switching computer and a server based on the at least one routing information item;
   transmitting to at least a first selected switching center of a plurality of selected switching centers a connection set-up request and connection data indicating the pattern of connections based on one of a result of said calculating;
   distributing the connection set-up request to at least a second selected switching center of the plurality of selected switching centers; and
   automatically setting up and controlling the connections to the subscriber terminals at the at least first selected switching center and the at least second selected switching center of the plurality of selected switching centers in dependence on the connection data.

2. The method as claimed in claim 1,
wherein tariff information with regard to the connections of the parties to the conference circuit are stored in the at least one of a switching computer and a server, and
wherein said calculating determines a cost-optimized pattern of connections based on the tariff information.

3. The method as claimed in claim 2, wherein the one of a switching computer and a server directly transmits data of the optimized pattern of connections to the plurality of selected switching centers.

4. The method as claimed in claim 3, wherein the plurality of switching centers sets up a cascaded pattern of connections with at least one subscriber terminal allocated to each switching center.

5. The method as claimed in claim 1,
wherein a number of alternative patterns of connections are calculated by the one of a switching computer and a server,
wherein said transmitting to the plurality of selected switching centers includes transmitting data with regard to the alternative patterns of connections, and
wherein said automatically setting up and controlling includes transmitting from each of the plurality of selected switching centers the connection set-up request and the data with regard to the alternative patterns of connections to a further switching center selected in accordance with the alternative pattern of connections in case of one of a lack of capacity and technical problems.

6. The method as claimed in claim 5, wherein data channels of an internet protocol network are used for at least some of said transmitting.

7. The method as claimed in claim 5, wherein data and signaling channels of a digital telecommunication network are used for at least some of said transmitting.

8. The method as claimed in claim 5, wherein a switching computer of one of a number of switching centers involved acts as central control computer for setting up and controlling the conference circuit via a number of network nodes.

9. The method as claimed in claim 8, wherein the conference circuit is set up between data terminals of subscribers to an internet protocol network and telecommunication terminals connected directly to at least one of a public telephone network and a private branch exchange.

10. The method as claimed in claim 9,
further comprising establishing the conference circuit between telecommunication terminals by interposition of data network channels for voice-over internet protocol connections, and
wherein said automatically setting up and controlling utilizes at least one data network server in controlling the conference circuit.

11. A method for setting up and controlling a conference circuit between subscriber terminals connected to network nodes of at least one of a telecommunication network and an internet protocol network, comprising:
transmitting an instruction for establishing the conference circuit from one of a subscriber terminal and an agent terminal of a call center to a server in the network storing at least one routing information item with respect to parties who will use the conference circuit,
calculating an optimized pattern of connections of the conference circuit in the server based on the at least one routing information item,
conveying identification data of a plurality of switching centers selected for setting up connections for the conference circuit to the one of a subscriber terminal and an agent terminal of at least one of a subscriber ordering the conference circuit, another subscriber and an agent, in dependence on a result of said calculating by the server, and
receiving a connection setup request from the one of a subscriber terminal and an agent terminal at the plurality of switching centers.

12. The method as claimed in claim 11,
wherein tariff information with regard to the connections of the parties to the conference circuit are stored in the server, and
wherein said calculating determines a cost-optimized pattern of connections based on the tariff information.

13. The method as claimed in claim 12, wherein the server directly transmits data of the optimized pattern of connections to the plurality of selected switching centers.

14. The method as claimed in claim 13, wherein the plurality of switching centers sets up a cascaded pattern of connections with at least one subscriber terminal allocated to each switching center.

15. The method as claimed in claim 11,
wherein a number of alternative patterns of connections are calculated by the server, and
wherein said further method comprises:
transmitting to the at least one switching center data with regard to the alternative patterns of connections; and
transmitting from each of the at least one switching center the connection set-up request and the data with regard to the alternative patterns of connections to a further switching center selected in accordance with the alternative pattern of connections in case of one of a lack of capacity and technical problems.

16. The method as claimed in claim 15, wherein data channels of an internet protocol network are used for at least some of said transmitting.

17. The method as claimed in claim 15, wherein data and signaling channels of a digital telecommunication network are used for at least some of said transmitting.

18. The method as claimed in claim 15,
wherein the conference circuit is set up between data terminals of subscribers to an internet protocol network and telecommunication terminals connected directly to at least one of a public telephone network and a private branch exchange.

19. The method as claimed in claim 18, further comprising establishing the conference circuit between telecommunication terminals by interposition of data network channels for voice-over internet protocol connections, wherein at least one data network server co-operates in controlling the conference circuit.

20. A system for setting up and controlling a conference circuit between subscriber terminals connected to network nodes at least one of an internet protocol network and at least one telecommunication network having a plurality of switching centers and said subscriber terminals connected to the switching centers, comprising:
one of a server in the internet protocol network and a switching computer in the at least one telecommunication network, including
a storage unit to store a routing database of routing information for the at least one of an internet protocol network and at least one telecommunication network, a receiving unit to receive an instruction for establishing a conference circuit from one of a subscriber terminal and an agent terminal of a call center, a pattern-of-connections calculating unit, coupled to said storage unit and said receiving unit to calculate at least one optimized pattern of connections of the conference circuit, and a transmitting unit, coupled to said pattern-of-connections calculating unit, to deliver a connection set-up request and data of the at least one optimized pattern of connections to a plurality of selected switching centers.

21. The system as claimed in claim 20, wherein the one of a server in the internet protocol network and a switching computer in the at least one telecommunication network further includes a tariff information memory, coupled to said pattern-of-connections calculating unit, to store tariff information with regard to the subscribers of the at least one telecommunication network, and wherein the pattern-of-connections calculating unit calculates the at least one optimized pattern of connections based on the tariff information.

22. The system as claimed in claim 21, wherein each selected switching center includes an interface for connection to the one of a server in the internet protocol network, to control setting up the connection.

23. The system as claimed in claim 22, wherein the server is connected to agent terminals of a call center via the internet protocol network.

24. The system as claimed in claim 23, further comprising at least one server in the internet protocol network to store a centralized routing database and a centralized tariff information memory for accessed by at least one of switching computers and servers.

* * * * *